US012607609B2

(12) United States Patent
Wolfe et al.

(10) Patent No.:  US 12,607,609 B2
(45) Date of Patent:       Apr. 21, 2026

(54) SYSTEMS AND METHODS FOR A VENTLESS GAS CHROMATOGRAPHY MASS SPECTROMETRY INTERFACE

(71) Applicant: Agilent Technologies, Inc., Santa Clara, CA (US)

(72) Inventors: Derek Wolfe, Santa Clara, CA (US); Wesley Norman, Santa Clara, CA (US)

(73) Assignee: Agilent Technologies, Inc., Santa Clara, CA (US)

(*) Notice: Subject to any disclaimer, the term of this patent is extended or adjusted under 35 U.S.C. 154(b) by 399 days.

(21) Appl. No.: 18/369,773

(22) Filed: Sep. 18, 2023

(65) Prior Publication Data

US 2025/0093309 A1      Mar. 20, 2025

(51) Int. Cl.
| | |
|---|---|
| *G01N 30/72* | (2006.01) |
| *G01N 30/32* | (2006.01) |
| *H01J 49/04* | (2006.01) |
| *G01N 30/02* | (2006.01) |

(52) U.S. Cl.
CPC ......... *G01N 30/7206* (2013.01); *G01N 30/32* (2013.01); *H01J 49/0422* (2013.01); *G01N 2030/025* (2013.01); *G01N 2030/324* (2013.01)

(58) Field of Classification Search
CPC .................................................. G01N 30/7206
See application file for complete search history.

(56) References Cited

U.S. PATENT DOCUMENTS

| | | |
|---|---|---|
| 4,641,541 A | 2/1987 | Sharp |
| 4,662,914 A | 5/1987 | Hansen et al. |
| 5,094,099 A * | 3/1992 | Ross ....................... G01N 30/84 |
| | | 73/864.81 |
| 9,463,534 B2 | 10/2016 | Hitchcock et al. |
| 2010/0019140 A1* | 1/2010 | Amirav ................. H01J 49/049 |
| | | 250/288 |
| 2022/0003724 A1* | 1/2022 | White ................ G01N 30/6047 |

FOREIGN PATENT DOCUMENTS

| | | |
|---|---|---|
| CN | 105372362 A | 3/2016 |
| CN | 109585255 A | 4/2019 |
| CN | 110726798 B | 1/2020 |

(Continued)

OTHER PUBLICATIONS

Anonymous: "Maintaining Your GC/MS System—Operate your Agilent GC/MS System with maximum efficiency", Jan. 1, 2001 {Jan. 1, 2001), pp. 1-48, XP055192088, Retrieved from the Internet: URL: http://www.sisweb.com/art/pdf/ms-maint.pdf [retrieved on May 28, 2015], p. 24-p. 25.

(Continued)

*Primary Examiner* — John E Breene
*Assistant Examiner* — Alex T Devito
(74) *Attorney, Agent, or Firm* — Foley & Lardner LLP

(57) ABSTRACT

Systems and methods for a ventless GC-MS interface are described herein. The system can include a gas chromatograph. The system can include a mass spectrometer connected to the gas chromatograph by a mass spectrometer flow path. The system can include a fitting. The fitting can include a sealing surface and one or more gas purge flow paths. The fitting can be fluidically connected to the mass spectrometer. The system can include a column disposed in a ferrule.

20 Claims, 9 Drawing Sheets

(56)            References Cited

FOREIGN PATENT DOCUMENTS

| CN | 116297988 | A | 6/2023 |
| JP | 3134325 | U | 8/2007 |

OTHER PUBLICATIONS

International Search Report and Written Opinion dated Nov. 22, 2024 on PCT App. PCT/US2024/040344 (15 pages).
Agilent Quick Swap: https://www.agilent.com/cs/library/brochures/5989-9803EN.pdf, G3185B QuickSwap Accessory Reference Manual (agilent.com).
Frontier Labs Vent-free GC/MS Adapter, https://www.frontier-lab.com/products/micro-reactor-system/17952/.
Restek EZ No-Vent GC Column MS Connector, https://www.restek.com/en/products/accessories-labware/gc-accessories/detector-supplies/4678/.
Thermo NeverVent ion source cap, https://www.thermofisher.com/us/en/home/products-and-services/promotions/industrial/unstoppable-gc-ms-analysis.html.

\* cited by examiner

FLOW
(FROM GC)

140

245

220

220

115

212

210

155

150

FLOW
(TO MS)

100

SYSTEMS AND METHODS FOR A VENTLESS GAS CHROMATOGRAPHY MASS SPECTROMETRY INTERFACE

TECHNICAL FIELD

The present application relates generally to mass spectrometry, including mass spectrometry coupled with gas chromatography.

BACKGROUND

A mass spectrometry (MS) system typically includes an ion source for ionizing components (particularly molecules) of a sample under investigation, followed by one or more ion processing devices providing various functions, followed by a mass analyzer for separating ions based on their differing mass-to-charge ratios (or m/z ratios, or more simply "masses"), followed by an ion detector at which the mass-sorted ions arrive and are thereby detected (e.g., counted). The MS system further includes electronics for processing output signals from the ion detector as needed to produce user-interpretable data in a format such as a chromatogram or a mass spectrum, which typically presents as a series of peaks indicative of the relative abundances of detected ions (e.g., ion signal intensity such as number of ion counts for each ion detected) as a function of their m/z ratios. The mass spectrum (e.g., MS spectrum, MS fragment spectrum) may be utilized to determine the molecular structures of components of the sample, thereby enabling the sample to be qualitatively and quantitatively characterized, including the identification and abundance of chemical compounds of the sample (and possibly also isotopologues and/or isotopomers of each compound found in the analysis).

The mass spectrometry technique may be enhanced by coupling it with another analytical separation technique that precedes the MS analysis stage, thus serving as the first stage of analytical separation. Examples include chromatographic techniques such as liquid chromatography (LC) or gas chromatography (GC). Gas chromatography (GC) is used to analyze and detect the presence of many different substances in a sample. The function of a gas chromatograph is to separate the components of a chemical sample, known as analytes, and detect the identity and/or the concentration of those components. The separation is frequently accomplished using a capillary GC column. In some instances, this column is essentially a piece of fused silica tubing with a stationary phase coating on the inside that interacts with the sample to separate the components. A pressurized gas, known as the mobile phase, is used to push the sample through the column. The GC column can remain isothermal throughout an analysis or be ramped in temperature.

SUMMARY

Servicing the flow path of a gas chromatography mass spectrometry (GC-MS) system can involve venting the vacuum of the MS system. This process can be time consuming to implement and can require additional time to allow the system to return to a state where analyses can be performed. If the system is not vented in a proper manner, damage to the components of the system can occur. The solutions described herein can provide a GC-MS interface that does not require venting the MS system when servicing certain GC flow path components.

At least one aspect of the present disclosure is directed to a gas chromatography mass spectrometry (GC-MS) system.

The system can include a gas chromatograph. The system can include a mass spectrometer connected to the gas chromatograph by a mass spectrometer flow path. The system can include a fitting. The fitting can include a sealing surface and one or more gas purge flow paths. The fitting can be fluidically connected to the mass spectrometer. The system can include a column disposed in a ferrule. The one or more gas purge flow paths can be connected to the fitting upstream of the sealing surface. The one or more gas purge flow paths are not in fluidic communication with the mass spectrometer flow path when the column is fluidically connected to the mass spectrometer flow path and there is a fluid-tight seal between the ferrule, the column, and the fitting. The one or more gas purge flow paths are in fluidic communication with the mass spectrometer flow path when there is not a fluid-tight seal between the ferrule, the column, and the fitting.

Another aspect of the present disclosure is directed to a method. The method can include providing a mass spectrometer flow path. The method can include disposing a sealing surface upstream and proximate to the mass spectrometer flow path. The method can include disposing one or more gas purge flow paths upstream of the sealing surface. In a first state, the method can include decoupling the sealing surface from a ferrule to put the one or more gas purge flow paths in fluidic communication with the mass spectrometer flow path. The ferrule can be configured to couple with a column. In the first state, the method can include flowing a purge gas through the one or more gas purge flow paths. In a second state, the method can include coupling the sealing surface with the ferrule to (1) remove the fluidic communication between the one or more gas purge flow paths and the mass spectrometer flow path and (2) put the column in fluidic communication with the mass spectrometer flow path. In the second state, the method can include ceasing a flow of the purge gas through the one or more gas purge flow paths. In the second state, the method can include flowing a sample through the column.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
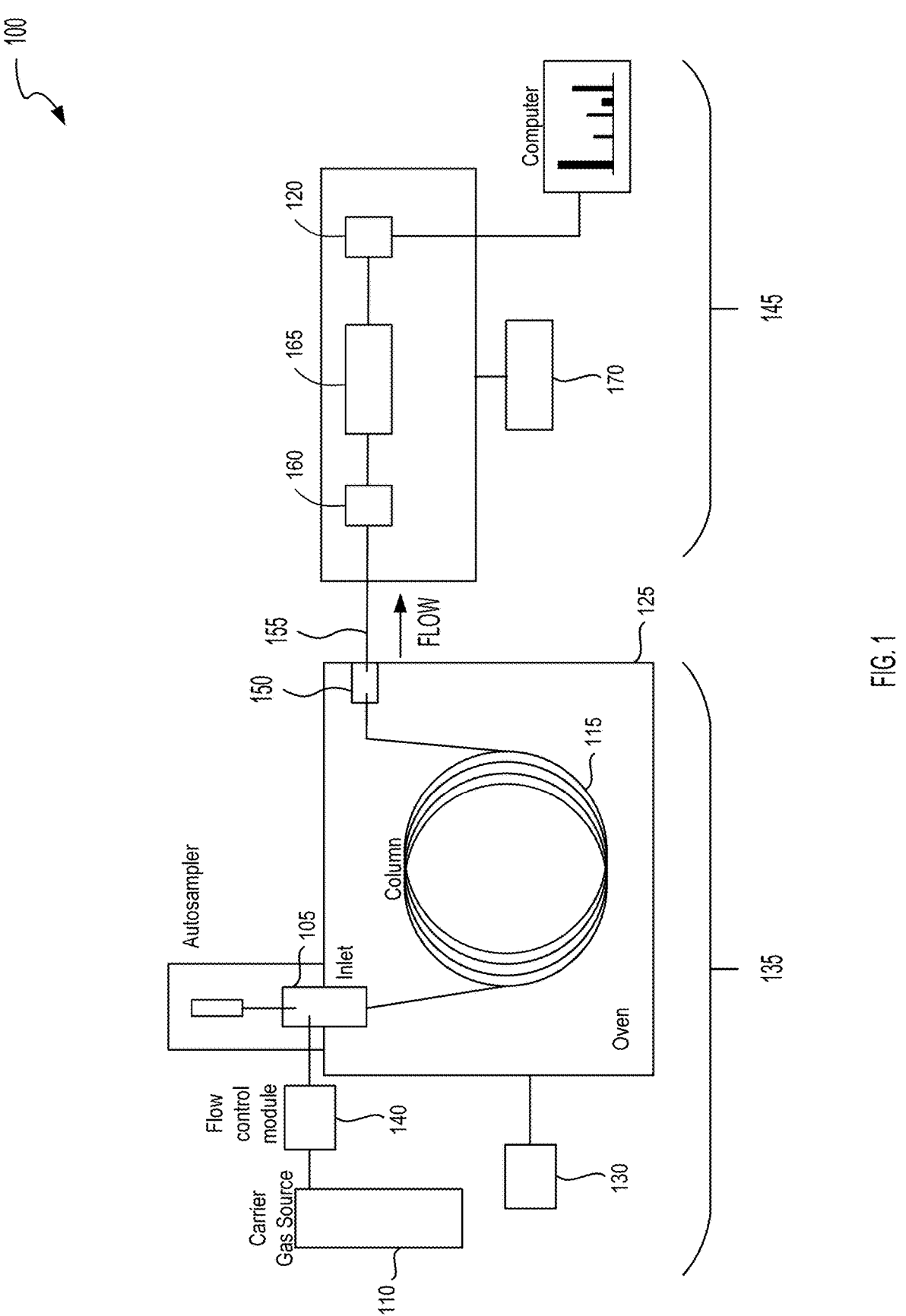
FIG. 1 is a schematic diagram of a gas chromatography mass spectrometry system in accordance with an embodiment.

Following below are more detailed descriptions of various concepts related to, and implementations of, methods, apparatuses, and systems for a ventless GC-MS interface. The various concepts introduced above and discussed in greater detail below may be implemented in any of a number of ways, as the described concepts are not limited to any particular manner of implementation. Examples of specific implementations and applications are provided primarily for illustrative purposes.

During operation of a gas chromatography mass spectrometry (GC-MS) system, the mass spectrometer can be under vacuum. When the system undergoes maintenance, such as service involving the flow path, changing inlet septa and/or liners, or trimming and/or changing columns, the system may need to be cooled down and vented, which can take multiple hours (e.g., 2 hours). Subsequently bringing the chamber of the mass spectrometer back to vacuum pressure (e.g., pump down) can take multiple hours (e.g., 8-24 hours). Opening the vacuum chamber can introduce new leaks, which need to be found and eliminated after pump down. Furthermore, opening the vacuum chamber can introduce contaminants when the chamber fills with air. The venting and pump down processes can be time consuming and costly.

The present disclosure is directed to systems and methods for a ventless GC-MS interface. The ventless GC-MS interface can improve the GC-MS system performance (e.g., no additional gas, higher sensitivity), usability (e.g., automated operation, ease of installation and use), and sustainability (e.g., compatibility with various gases such as nitrogen, helium, or hydrogen, and reduced overall gas consumption).

The disclosed solutions have a technical advantage of providing a ventless GC-MS interface that does not degrade the GC-MS system performance. The solutions can allow a user to rapidly perform GC-MS system service and return the GC-MS system to operation, improve usability for easy installation and operation, eliminate user error through fully automated control, use gases other than helium, and/or reduce total consumption and cost of laboratory gases. The solutions can protect sensitive instrument components from oxidation damage, improve ion source performance, improve MS sensitivity by enabling optimal ion source flows, be easy to install and remove from the instrument, achieve leak-free ferrule connections, be retrofittable without modifications to existing methods, allow fully automated control and feedback via onboard maintenance procedures, eliminate gas consumption during normal operation when analyses are running, reduce overall annual gas consumption for all users, and/or support inexpensive and sustainable nitrogen gas in addition to helium. The solutions can maintain the vacuum of the vacuum chamber. The solutions can allow for a purge flow that is not fluidically connected to the mass spectrometer when the column is connected, thereby allowing the purge flow to be turned off when analyses are being run and not provide additional flow to the mass spectrometer. The additional flow can impact the analysis and be unnecessary.

FIG. 1 is a schematic diagram of a gas chromatography mass spectrometry system 100. The GC-MS system 100 can include a representative GC-MS system. The GC-MS system 100 can include a gas chromatograph 135 (GC).

The gas chromatograph 135 can include one or more injection ports 105 (e.g., inlet, sample inlet). The injection port 105 can receive a sample injected into the gas chromatograph 135 for analysis. For example, the sample can be injected into the injection port 105 where, if not already in a gaseous state, it is vaporized into the gaseous state for analysis by the gas chromatograph 135.

The gas chromatograph 135 can include one or more pressurized gas sources 110 (e.g., pressurized gas supply, gas source, gas supply, supply gas). The pressurized gas source 110 can include a tank. The pressurized gas source 110 (e.g., carrier gas supply, carrier gas source, carrier gas) can be fluidly (e.g., fluidically) coupled with (e.g., connected to) the injection port 105. The pressurized gas source 110 can supply a carrier gas, such as but not limited to, helium, hydrogen, nitrogen, an argon/methane mixture, or other such inert gas, that transports the injected sample from the injection port 105 through the gas chromatograph 135. The pressurized gas source 110 can include a source of pressurized gas. The pressurized gas source 110 can be a gas distribution system of pressurized gases. The pressurized gases can be found in a laboratory. The pressurized gas source 110 can include multiple gases. The pressurized gas source 110 can be coupled with the gas chromatograph 135 via a distribution panel.

The gas chromatograph 135 can include one or more electronic pneumatic control (EPC) modules 140 (e.g., flow control modules). The electronic pneumatic control module 140 can be coupled with (e.g., connected to) the pressurized gas source 110. The electronic pneumatic control module 140 can be fluidly coupled with the injection port 105. For example, the injection port 105 can be attached to the electronic pneumatic control module 140. The electronic pneumatic control module 140 can control the flow and/or pressure of the injection port 105. The carrier gas can go to a first electronic pneumatic control module before going to the injection port 105. Each inlet can have its own electronic pneumatic control module 140. Each electronic pneumatic control module 140 can be coupled with the same gas supply or different gas supplies.

The gas chromatograph 135 can include one or more columns 115 (e.g., tube, restrictor, separation column). The column 115 can be fluidly coupled with the injection port 105. The column 115 can be selected from a wide variety of columns utilized to achieve separation of components of a sample by gas chromatography. Gas chromatographs 135 configured for backflushing, detector splitting, or other pneumatic switching can include multiple columns 115. The carrier gas can transport the sample from the injection port 105 to the column 115 for separation. The column 115 can separate the components of the gaseous sample to produce one or more analytes of interest for analysis by the gas chromatograph 135. The column 115 can include a capillary column and/or may include fused silica tubing with a coating (e.g., stationary phase coating) on the inner portions of the tubing that interacts with the sample injected into the injection port 105 to separate the components of the sample. The column 115 can be made of metal. Dimensions of the column 115 can include an inner diameter range of 50 μm (microns) to 530 μm and a length range of up to 200 meters. The injection port 105 can provide samples to the column 115 for separation. The column 115 can include a separation column or a column that serves as a restrictor fluidically connected to a separation column.

The gas chromatograph 135 can include one or more column heaters 125. The column heater 125 can include an oven, a convection heater, a conduction heater, an air bath, or other such heating device for heating certain components of the gas chromatograph 135. The column heater 125 can heat or cool the column 115 and other flow path components to desired temperatures. The column heater 125 can be configured to heat the column 115 such that the column 115 remains isothermal during sample analysis.

The gas chromatograph 135 can include one or more controllers 130. The controller 130 can be communicably connected, directly or indirectly, to the column heater 125, the injection port 105, one or more sensors, and/or other components of the gas chromatograph 135. The controller 130 can be electrically coupled with the gas chromatograph 135. The controller 130 can be an onboard computing component that is physically incorporated into the housing of the gas chromatograph 135 that contains the column 115, column heater 125, and other components of the gas chromatograph 135. The controller 130 can be one or more separate computing devices and/or other such controlling devices that are internal and/or external to the housing of the gas chromatograph 135. The controller 130 or a portion of the controller 130 can reside within the gas chromatograph 135. For example, the controller 130 or a portion of the controller 130 can be disposed in the gas chromatograph 135. The controller 130 can be split between multiple locations. The controller 130 can be disposed outside of the gas chromatograph 135.

The controller 130 can include one or more processors, such as but not limited to, a single-core processor, a multi-core processor, a logic device, or other such data processing circuitry, configured to execute, analyze, and process data and information of the gas chromatograph 135. The controller 130 can include a non-transitory memory device communicably connected to the processor. The memory device may be configured as a volatile memory device (e.g., SRAM and DRAM), a non-volatile memory device (e.g., flash memory, ROM, and hard disk drive), or any combination thereof. The memory device may store executable code and other such information that is generated and/or processed by the processor during operation of the gas chromatograph 135.

The gas chromatograph 135 can include one or more input/output devices communicably connected to the controller 130. The input/output device can enable an operator and/or user to receive information from the controller 130 and to input information and parameters into the controller 130. Such information and parameters can be stored in the memory device, accessed by the processor, and output to the input/output device. For example, the input/output device can include a monitor, display device, touchscreen device, keyboard, microphone, joystick, dial, button, or other such device to enable input and output of information and parameters. The input/output device may be utilized to input information into the controller 130 and output or otherwise display information and data generated by the processor of the gas chromatograph 135.

The gas chromatograph 135 can include one or more fittings 150 (e.g., interface, union, ventless interface, ventless GC-MS interface). The fitting 150 can be made of stainless steel. The fitting 150 can be disposed in the gas chromatograph 135. For example, the fitting 150 can be partially disposed in the gas chromatograph 135. The fitting 150 can be fluidically connected to the mass spectrometer 145 (MS). The fitting 150 can be fluidically connected to the column 115. The column 115 can be disposed in the fitting 150.

The GC-MS system 100 can include a mass spectrometer 145. The mass spectrometer 145 can be connected to the gas chromatograph 135 by a mass spectrometer flow path 155. The mass spectrometer flow path 155 can be downstream of the column 115. The column 115 can be upstream of the mass spectrometer flow path 155. The column 115 can include a piece of tubing that transports the flow from the gas chromatograph 135 moving towards the mass spectrometer 145. The fitting 150 can be fluidically connected to the mass spectrometer flow path 155. The mass spectrometer flow path 155 can include a tube. The interior of the mass spectrometer 145 can include a chamber. The mass spectrometer flow path 155 can provide a restriction.

The mass spectrometer flow path 155 can have an inner diameter in a range of 50 μm to 150 μm. For example, the inner diameter of the mass spectrometer flow path 155 can be in a range of 50 μm to 75 μm, 50 μm to 100 μm, 50 μm to 125 μm, 50 μm to 150 μm, 75 μm to 100 μm, 75 μm to 125 μm, 75 μm to 150 μm, 100 μm to 125 μm, 100 μm to 150 μm, or 125 μm to 150 μm. The inner diameter of the mass spectrometer flow path 155 can be less than 50 μm. The inner diameter of the mass spectrometer flow path 155 can be greater than 150 μm.

The mass spectrometer flow path 155 can be made can be made of fused silica or metal (e.g., deactivated metal). The mass spectrometer flow path 155 can have a length in a range of 10 cm to 30 cm. For example, the length of the mass spectrometer flow path 155 can be in a range of 10 cm to 15 cm, 10 cm to 20 cm, 10 cm to 25 cm, 10 cm to 30 cm, 15 cm to 20 cm, 15 cm to 25 cm, 15 cm to 30 cm, 20 cm to 25 cm, 20 cm to 30 cm, or 25 cm to 30 cm. The length of the mass spectrometer flow path 155 can be less than 10 cm. The length of the mass spectrometer flow path 155 can be greater than 30 cm.

The mass spectrometer 145 can include an ion source 160 (e.g., ionization apparatus). The output of the gas chromatograph 135 can be provided to the ion source 160. The ion source 160 can be fluidically connected to the fitting 150 by (e.g., via) the mass spectrometer flow path 155 and can be downstream of the mass spectrometer flow path 155. The ion source 160 can produce analyte ions from a sample stream received from the gas chromatograph 135. The ion source 160 can include an electron impact apparatus or a chemical ionization apparatus.

The mass spectrometer 145 can include a mass analyzer 165. The ion source 160 can direct the analyte ions into the mass analyzer 165. The mass analyzer 165 can include a device configured to separate, sort, or filter analyte ions on the basis of their respective masses (e.g., mass-to-charge ratios, or m/z ratios). Examples of mass analyzers 165 can include multipole electrode structures (e.g., mass filters, ion traps), time-of-flight (TOF) components, electrostatic analyzers (ESAs), or magnetic sectors. The mass analyzer 165 can include a system of more than one mass analyzer. The mass analyzer 165 can be fluidically coupled with the ion source 160.

The mass spectrometer 145 can include an ion detector 120. The ion detector 120 can include a device configured to collect and measure the flux (or current) of mass-discriminated ions outputted from the mass analyzer 165. Examples of ion detectors 120 can include electron multipliers, photomultipliers, and Faraday cups. The ion detector 120 can be fluidically coupled with the mass analyzer 165.

The mass spectrometer 145 can include a vacuum system 170. The vacuum system 170 can maintain the ion source 160 at a desired low pressure or vacuum level. The vacuum system 170 can maintain the mass analyzer 165 and ion detector 120 at desired vacuum levels. The vacuum system 170 can include one or more vacuum pumps. The vacuum system 170 can keep the one or more components (e.g., chambers) of the mass spectrometer 145 at a desired vacuum level.

Figure 2:
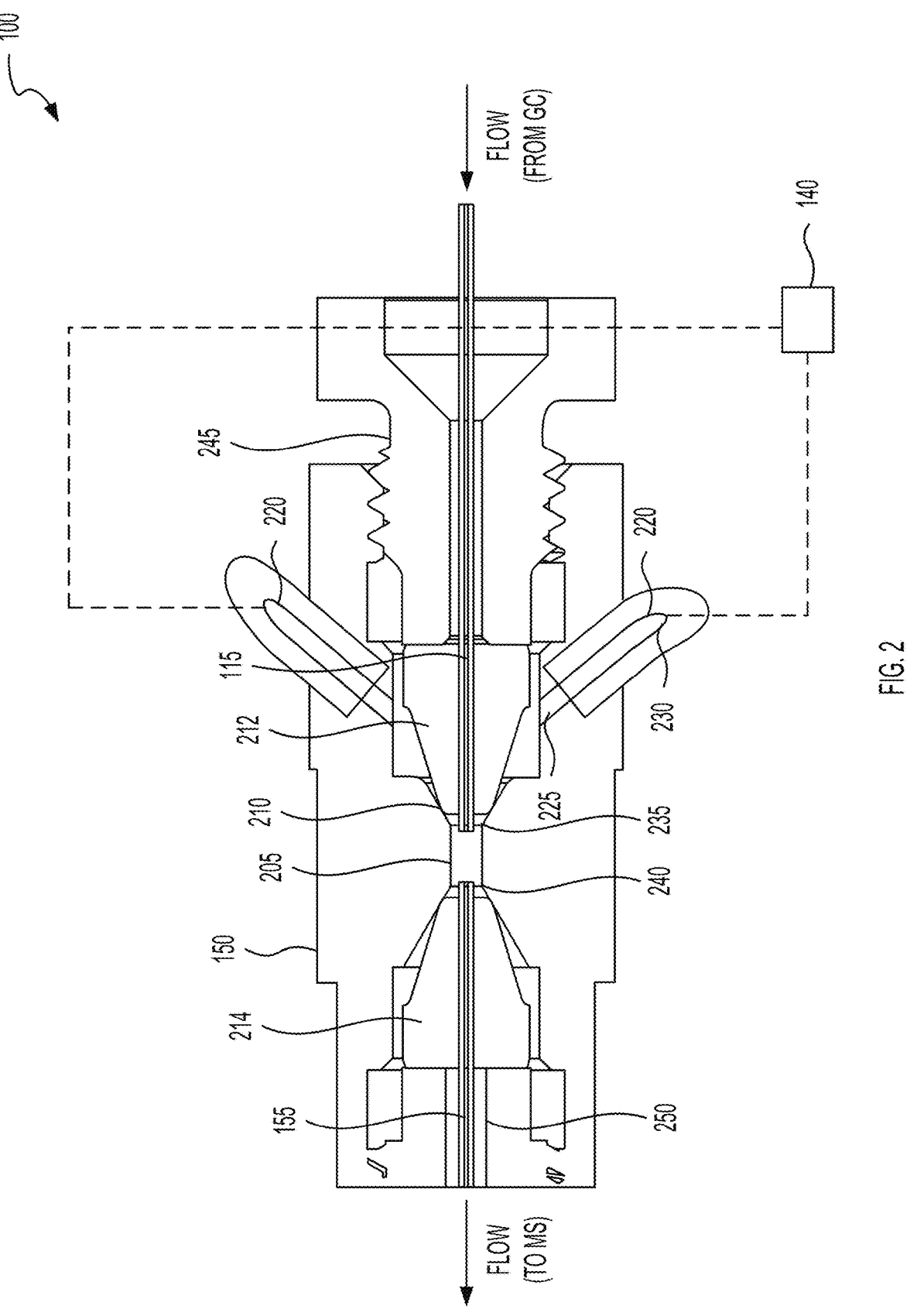
FIG. 2 is a cross-sectional view of a schematic diagram of a portion of the gas chromatography mass spectrometry system in accordance with an embodiment.

FIG. 2 is a schematic diagram of a portion of the GC-MS system 100. The GC-MS system 100 can include the mass spectrometer flow path 155 and the column 115. The mass spectrometer flow path 155 can be fluidically connected to the column 115.

The GC-MS system 100 can include a transfer line 250 (e.g., MS transfer line, mass spectrometer transfer line). The fitting 150 can screw into the transfer line 250 or be clamped using alternative means. The mass spectrometer flow path 155 can be coupled with the transfer line 250. The transfer line 250 can include a tube with an inner diameter large enough to fit the mass spectrometer flow path 155 within the tube. The transfer line 250 can include a tube with a flange on the tube. The flange can seal to the side of the mass spectrometer 145. The transfer line 250 can house the mass spectrometer flow path 155. The mass spectrometer flow path 155 can be inserted into the transfer line 250. The transfer line 250 can be made of metal (e.g., stainless steel). The fitting 150 can be welded or brazed to the transfer line 250. The fitting 150 can be securely attached to the transfer line 250. The fitting 150 can be machined out of the end of the transfer line 250. The fitting 150 can be permanently or non-permanently attached to the transfer line 250. The fitting 150 and the transfer line 250 can couple to form a gas-tight seal.

The GC-MS system 100 can include the fitting 150. The fitting 150 can be fluidically connected to the mass spectrometer 145. For example, the fitting 150 can be fluidically connected to the mass spectrometer 145 by the mass spectrometer flow path 155. The fitting 150 can be fluidically connected to the gas chromatograph 135. For example, the fitting 150 can be fluidically connected to the gas chromatograph 135 by the column 115. The fitting 150 can be made of metal (e.g., stainless steel).

The fitting 150 can include a sealing surface 210 (e.g., fitting sealing surface). The sealing surface 210 can include a conical sealing surface. The sealing surface 210 can be configured to seal against (e.g., form a gas-tight connection with) a ferrule. The conical sealing surface can be configured to seal with the ferrule. The sealing surface 210 can couple with the ferrule. For example, the sealing surface 210 can receive the ferrule. The sealing surface 210 can be less rough than non-sealing surfaces. The sealing surface 210 can be free of scratches in the same direction as the column 115. The sealing surface 210 can be hard enough to avoid deformation and damage.

The fitting 150 can include one or more gas purge flow paths 220. For example, the one or more gas purge flow paths 220 can include one gas purge flow path, two gas purge flow paths, three gas purge flow paths, four gas purge flow paths, or five gas purge flow paths. The one or more gas purge flow paths 220 can include greater than five gas purge flow paths.

The one or more gas purge flow paths 220 can flow a purge gas. For example, the one or more gas purge flow paths 220 can flow at least one of nitrogen, helium, or hydrogen. The one or more gas purge flow paths 220 can be connected to (e.g., welded to, brazed to) the fitting 150. For example, the one or more gas purge flow paths 220 can be connected to the fitting 150 upstream of the sealing surface 210. The one or more gas purge flow paths 220 can be connected to the fitting 150 upstream of the seal between the ferrule and the sealing surface 210. The one or more gas purge flow paths 220 can be welded to or brazed to the fitting 150. The one or more gas purge flow paths 220 can be fluidically connected to the fitting 150. The one or more gas purge flow paths 220 can be mechanically or physically connected to (e.g., coupled with, attached to) the fitting 150. The one or more gas purge flow paths 220 can flow a gas that does not damage hot components (e.g., components greater than 100° C.) of the mass spectrometer 145 under vacuum.

The one or more gas purge flow paths 220 can include multiple gas purge flow paths. For example, the one or more gas purge flow paths 220 can include a first gas purge flow path. The one or more gas purge flow paths 220 can include a second gas purge flow path. The first gas purge flow path can be disposed opposite the second gas purge flow path. The first gas purge flow path and the second gas purge flow path can be disposed on the same side. The one or more gas purge flow paths 220 can be equally or unequally spaced around the fitting 150.

The one or more gas purge flow paths 220 can include a first side 225 of the one or more gas purge flow paths 220. The one or more gas purge flow paths 220 can include a second side 230 of the one or more gas purge flow paths 220. The purge gas can flow from a second side 230 of the one or more gas purge flow paths 220 to the first side 225 of the one or more gas purge flow paths 220. The first side 225 of the one or more gas purge flow paths 220 can be connected to the fitting 150 upstream of the sealing surface 210. The first side 225 of the one or more gas purge flow paths 220 can be fluidically connected to the fitting 150 upstream of the sealing surface 210. The first side 225 of the one or more gas purge flow paths 220 can be mechanically or physically connected to the fitting 150 upstream of the sealing surface 210.

The one or more gas purge flow paths 220 can include one or more tubes. For example, the one or more tubes can include one tube, two tubes, three tubes, four tubes, or five tubes. The one or more tubes can include greater than five tubes. The one or more tubes can be made of stainless steel. For example, the one or more tubes can be made of austenitic stainless steel. The one or more tubes can be corrosion resistant. The one or more tubes can be welded or brazed to the fitting 150. The one or more tubes can be attached to the fitting 150 by a method that forms a gas tight seal and can withstand elevated temperatures. The one or more tubes can be connected to the fitting 150. For example, the one or more tubes can be connected to the fitting 150 a distance in a range of 0.5 mm to 10 mm upstream of the sealing surface 210. The distance between the one or more tubes and the sealing surface 210 can be in a range of 0.5 mm to 1 mm, 0.5 mm to 2 mm, 0.5 mm to 5 mm, 0.5 mm to 10 mm, 1 mm to 2 mm, 1 mm to 5 mm, 1 mm to 10 mm, 2 mm to 5 mm, 2 mm to 10 mm, or 5 mm to 10 mm. The distance can be less than 0.5 mm or greater than 10 mm.

A diameter 305 (e.g., inner diameter) of the one or more tubes can be in a range of 300 μm to 1000 μm. For example, the diameter 305 of the one or more tubes can be 300 μm, 350 μm, 400 μm, 450 μm, 500μ, 550 μm, 600 μm, 650 μm, 700 μm, 750 μm, 800 μm, 850 μm, 900 μm, 950 μm, or 1000 μm. The diameter 305 of the one or more tubes can be in a range of 300 μm to 400 μm, 300 μm to 500 μm, 300 μm to 600 μm, 300 μm to 700 μm, 300 μm to 800 μm, 300 μm to 900 μm, 300 μm to 1000 μm, 400 μm to 500 μm, 400 μm to 600 μm, 400 μm to 700 μm, 400 μm to 800 μm, 400 μm to 900 μm, 400 μm to 1000 μm, 500 μm to 600 μm, 500 μm to 700 μm, 500 μm to 800 μm, 500 μm to 900 μm, 500 μm to 1000 μm, 600 μm to 700 μm, 600 μm to 800 μm, 600 μm to 900 μm, 600 μm to 1000 μm, 700 μm to 800 μm, 700 μm to 900 μm, 700 μm to 1000 μm, 800 μm to 900 μm, 800 μm to 1000 μm, or 900 μm to 1000 μm. The diameter can be less than 300 μm or greater than 1000 μm.

Gas flowing through the one or more gas purge flow paths 220 can be controlled by a dedicated electronic pneumatic control module 140. The electronic pneumatic control module 140 can direct gas (e.g., inert gas) towards the sealing surface 210. For example, the electronic pneumatic control module 140 can direct gas towards the sealing surface 210 to prevent oxygen from entering the mass spectrometer 145. The oxygen can be from the ambient air (e.g., room air). The electronic pneumatic control module 140 can direct gas towards the sealing surface 210 to prevent oxygen from entering the vacuum of the mass spectrometer 145. The electronic pneumatic control module 140 can direct gas towards the sealing surface 210 to fully purge oxygen from cavity or a volume defined by the conical sealing surface.

The electronic pneumatic control module 140 can turn on the flow or pressure before (e.g., immediately before) the seal between sealing surface 210 of the fitting 150 and the ferrule is broken. This can allow the gas in the one or more gas purge flow paths 220 to purge the volume defined by the conical sealing surface when the column 115 is removed.

The electronic pneumatic control module 140 can automatically activate gas to flow through the one or more gas purge flow paths 220. For example, the electronic pneumatic control module 140 can flow gas through the one or more gas purge flow paths 220 responsive to a break in the flow path. The electronic pneumatic control module 140 can flow gas through the one or more gas purge flow paths 220 responsive to removal of the column 115. The electronic pneumatic control module 140 can flow gas through the one or more gas purge flow paths 220 responsive to a break in the fluid-tight seal.

When a user runs a maintenance procedure that involves breaking the flow path, the electronic pneumatic control module 140 can automatically activate purge gas to flow through the one or more gas purge flow paths 220. The electronic pneumatic control module 140 can control at least one of a flow rate or a pressure of a purge gas disposed in the one or more gas purge flow paths 220. The flow through each of the one or more gas purge flow paths 220 can be the same or different. A single electronic pneumatic control module 140 can provide flow to all of the one or more gas purge flow paths 220. Each of the one or more gas purge flow paths 220 can have a separate electronic pneumatic control module 140.

The fitting 150 can include one or more first cavities 205. The mass spectrometer flow path 155 can be coupled with the first cavity 205. The first cavity 205 can include a volume that bridges the gap between the column 115 and the mass spectrometer flow path 155. The first cavity 205 can be fluidically connected to the column 115. The first cavity 205 can include a first side 235 of the first cavity 205. The first cavity 205 can include a second side 240 of the first cavity 205. The first cavity 205 can be coupled with the sealing surface 210. For example, the first side 235 of the first cavity 205 can be coupled with the sealing surface 210. The first side 225 of the one or more gas purge flow paths 220 can be connected to the fitting 150 upstream of the first cavity 205. The first cavity 205 can couple the gas chromatograph 135 with the mass spectrometer 145. The electronic pneumatic control module 140 can direct gas towards the sealing surface 210 to prevent oxygen from entering the first cavity 205. The first cavity 205 can be fluidically coupled with the vacuum system 170. A distance between the first cavity 205 and the one or more gas purge flow paths 220 can be up to 1 cm. The distance between the first cavity 205 and the one or more gas purge flow paths 220 can be in a range of 0.5 mm to 10 mm. The distance between the first cavity 205 and the one or more gas purge flow paths 220 can be greater than 1 cm. The inner diameter of the first cavity 205 can be greater than the outer diameter of the column 115.

The GC-MS system 100 can include one or more ferrules. The ferrule can include a first ferrule 212 or second ferrule 214. The ferrule can be any shape. For example, the ferrule can be conical. The column 115 (e.g., tube) can be disposed in the first ferrule 212). The first ferrule 212 can couple with the column 115. For example, the column 115 can be inserted into the first ferrule 212. The first cavity 205 can be terminated with the first ferrule 212 and/or the second ferrule 214. The ferrule can have a cone angle in a range of 30 degrees to 70 degrees. For example, the cone angle can be in a range of 30 degrees to 40 degrees, 30 degrees to 50 degrees, 30 degrees to 60 degrees, 30 degrees to 70 degrees, 30 degrees to 80 degrees, 40 degrees to 50 degrees, 40 degrees to 60 degrees, 40 degrees to 70 degrees, 40 degrees to 80 degrees, 50 degrees to 60 degrees, 50 degrees to 70 degrees, 50 degrees to 80 degrees, 60 degrees to 70 degrees, 60 degrees to 80 degrees, or 70 degrees to 80 degrees. The ferrule can be made of various materials, such as a polyimide-based plastic (e.g., vespel), graphite, Teflon, steel, gold plated steel, and/or brass.

The ferrule can have an inner diameter in a range of 0.1 mm to 0.8 mm. For example, the inner diameter of the ferrule can be in a range of 0.1 mm to 0.2 mm, 0.1 mm to 0.25 mm, 0.1 mm to 0.3 mm, 0.1 mm to 0.4 mm, 0.1 mm to 0.5 mm, 0.1 mm to 0.6 mm, 0.1 mm to 0.7 mm, 0.1 mm to 0.8 mm, 0.2 mm to 0.25 mm, 0.2 mm to 0.3 mm, 0.2 mm to 0.4 mm, 0.2 mm to 0.5 mm, 0.2 mm to 0.6 mm, 0.2 mm to 0.7 mm, 0.2 mm to 0.8 mm, 0.25 mm to 0.3 mm, 0.25 mm to 0.4 mm, 0.25 mm to 0.5 mm, 0.25 mm to 0.6 mm, 0.25 mm to 0.7 mm, 0.25 mm to 0.8 mm, 0.3 mm to 0.4 mm, 0.3 mm to 0.5 mm, 0.3 mm to 0.6 mm, 0.3 mm to 0.7 mm, 0.3 mm to 0.8 mm, 0.4 mm to 0.5 mm, 0.4 mm to 0.6 mm, 0.4 mm to 0.7 mm, 0.4 mm to 0.8 mm, 0.5 mm to 0.6 mm, 0.5 mm to 0.7 mm, 0.5 mm to 0.8 mm, 0.6 mm to 0.7 mm, 0.6 mm to 0.8 mm, or 0.7 mm to 0.8 mm.

The first ferrule 212 and the second ferrule 214 can be disposed on opposite ends of the first cavity 205. The first ferrule 212 can be configured to couple with the sealing surface 210 and create a gas-tight seal between the column 115, the first ferrule 212, and the sealing surface 210. The first ferrule 212 can be disposed upstream and proximate to the first side 235 of the first cavity 205. The mass spectrometer flow path 155 can be disposed in the second ferrule 214. The sealing surface 210 can be disposed upstream and proximate to the first side 235 of the first cavity 205. The second ferrule 214 can be disposed downstream and proximate to the second side 240 of the first cavity 205. The second ferrule 214 can be configured to couple with the transfer line 250, the mass spectrometer flow path 155, and/or the fitting 150. For example, the second ferrule 214 can make (e.g., form) a gas-tight seal with the transfer line 250, the mass spectrometer flow path 155, and the fitting 150. The transfer line 250 can be fluidically coupled with the vacuum system 170. The fitting 150 can be screwed onto the transfer line 250. This can apply a force from the end of the transfer line 250 onto the back of the second ferrule 214, causing the second ferrule 214 to create seals with the fitting 150, the mass spectrometer flow path 155, and the transfer line 250.

The first ferrule 212 can couple with a threaded nut 245. The threaded nut 245 can apply pressure to the first ferrule 212. For example, the threaded nut 245 can apply pressure to the first ferrule 212 such that the first ferrule 212 forms a first seal (e.g., fluid-tight seal) against the sealing surface 210 and forms a second seal against the column 115. The threaded nut 245 can push against the back of the first ferrule 212. The threaded nut 245 can screw into the fitting 150. Pressure can be applied to the first ferrule 212 to create a seal using various mechanisms, such as a clamping mechanism.

The portion of the GC-MS system 100 shown in FIG. 2 can illustrate a state of the system in which the one or more gas purge flow paths 220 are not in fluidic communication with the mass spectrometer flow path 155. In this state, the column 115 can be fluidically connected to the mass spectrometer flow path 155. Additionally, in this state, there can be a fluid-tight seal between the first ferrule 212, the column 115, and the fitting 150. The column 115 can be installed in the fitting 150.

Figure 3:
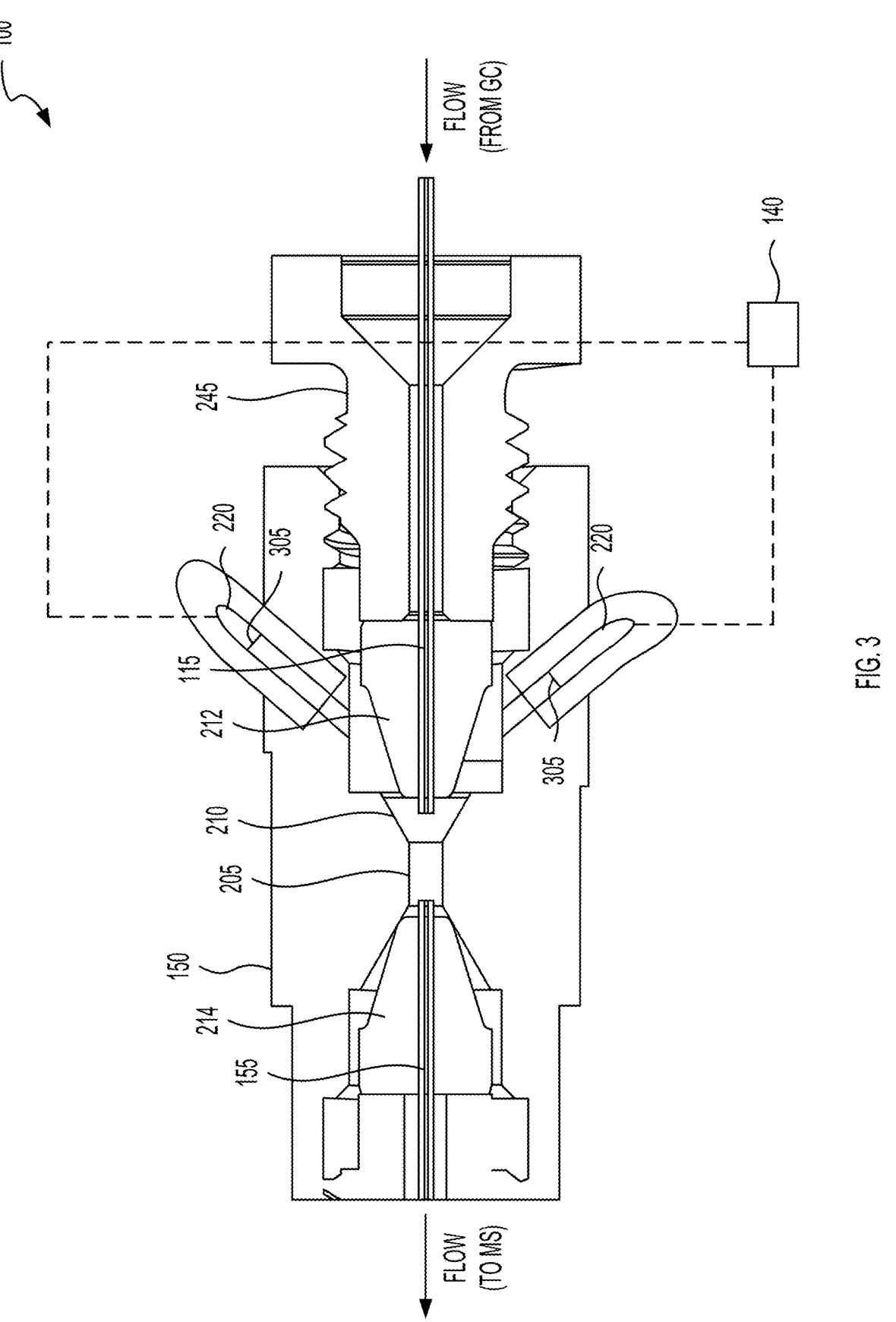
FIG. 3 is a cross-sectional view of a schematic diagram of a portion of the gas chromatography mass spectrometry system in accordance with an embodiment.

FIG. 3 is a schematic diagram of a portion of the GC-MS system 100. The GC-MS system 100 can include the mass spectrometer flow path 155, the column 115, the electronic pneumatic control module 140, the fitting 150, the first cavity 205, the sealing surface 210, the first ferrule 212, the second ferrule 214, the one or more gas purge flow paths 220, and the threaded nut 245.

The portion of the GC-MS system 100 shown in FIG. 3 can illustrate a state of the system in which the one or more gas purge flow paths 220 are in fluidic communication with the mass spectrometer flow path 155. In this state, there is not a fluid-tight seal between the first ferrule 212, the column 115, and the sealing surface 210 of the fitting 150. The column 115 can be partially removed from the fitting 150.

Figure 4:
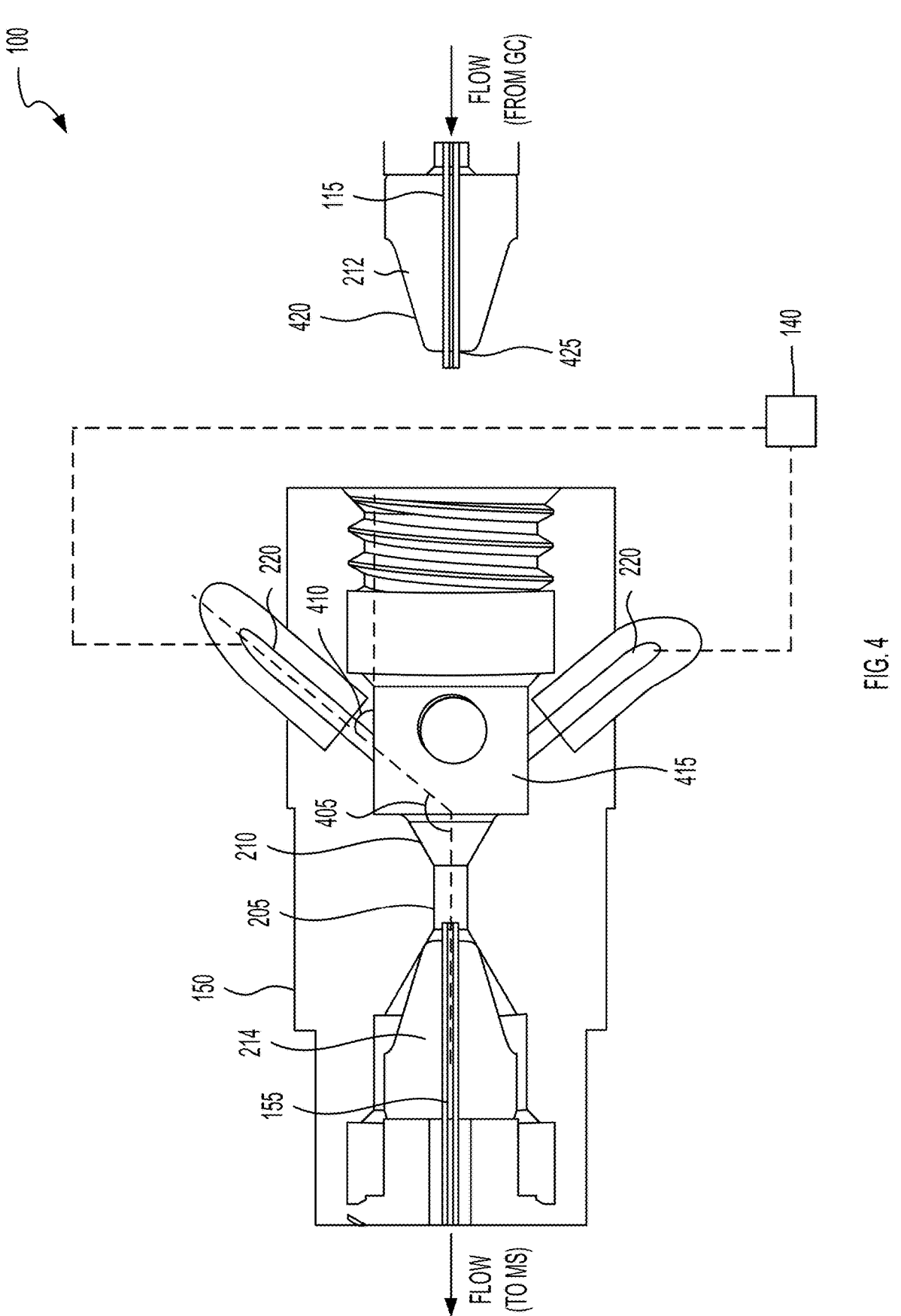
FIG. 4 is a cross-sectional view of a schematic diagram of a portion of the gas chromatography mass spectrometry system in accordance with an embodiment.

FIG. 4 is a schematic diagram of a portion of the GC-MS system 100. The GC-MS system 100 can include the mass spectrometer flow path 155, the column 115, the electronic pneumatic control module 140, the fitting 150, the first cavity 205, the sealing surface 210, the first ferrule 212, the second ferrule 214, and the one or more gas purge flow paths 220.

The one or more gas purge flow paths 220 can include one or more tubes. An angle 405 between the one or more tubes and an axis of the first cavity 205 can be in a range of 0 degrees to 180 degrees. For example, the angle 405 between the one or more tubes and the axis of the first cavity 205 can be 0 degrees, 1 degree, 5 degrees, 10 degrees, 20 degrees, 30 degrees, 40 degrees, 50 degrees, 60 degrees, 70 degrees, 80 degrees, 90 degrees, 100 degrees, 110 degrees, 120 degrees, 130 degrees, 140 degrees, 150 degrees, 160 degrees, 170 degrees, or 180 degrees. The angle 405 between the one or more tubes and the axis of the first cavity 205 can be in a range of 90 degrees to 120 degrees, 90 degrees to 150 degrees, 90 degrees to 180 degrees, 120 degrees to 150 degrees, 120 degrees to 180 degrees, or 150 degrees to 180 degrees. The one or more gas purge flow paths 220 can be disposed parallel to the first cavity 205. For example, the one or more tubes of the one or more gas purge flow paths 220 can be disposed parallel to the first cavity 205.

The one or more gas purge flow paths 220 can couple with a second cavity 415. The second cavity 415 can be disposed upstream of the sealing surface 210. The second cavity 415 can be disposed downstream of the one or more gas purge flow paths 220. An angle 410 between the one or more tubes and a surface of the second cavity 415 can be in a range of 0 degrees to 90 degrees. For example, the angle 410 between the one or more tubes and a surface of the second cavity 415 can be 0 degrees, 1 degree, 5 degrees, 10 degrees, 20 degrees, 30 degrees, 35 degrees, 40 degrees, 45 degrees, 50 degrees, 60 degrees, 70 degrees, 80 degrees, or 90 degrees. The angle 410 between the one or more tubes and the surface of the second cavity 415 can be greater than 90 degrees. The angle 410 between the one or more tubes and a surface of the second cavity 415 can be in a range of 25 degrees to 30 degrees, 25 degrees to 35 degrees, 25 degrees to 40 degrees, 25 degrees to 45 degrees, 25 degrees to 50 degrees, 25 degrees to 55 degrees, 30 degrees to 35 degrees, 30 degrees to 40 degrees, 30 degrees to 45 degrees, 30 degrees to 50 degrees, 30 degrees to 55 degrees, 35 degrees to 40 degrees, 35 degrees to 45 degrees, 35 degrees to 50 degrees, 35 degrees to 55 degrees, 40 degrees to 45 degrees, 40 degrees to 50 degrees, 40 degrees to 55 degrees, 45 degrees to 50 degrees, 45 degrees to 55 degrees, or 50 degrees to 55 degrees.

Gas flowing through the one or more gas purge flow paths 220 can be directed towards the sealing surface 210. For example, gas flowing through the one or more gas purge flow paths 220 can be directed towards the sealing surface 210 to prevent oxygen from entering the mass spectrometer 145. Gas flowing through the one or more gas purge flow paths 220 can prevent oxygen from entering the vacuum chamber of the mass spectrometer 145. Gas flowing through the one or more gas purge flow paths 220 can prevent oxygen from entering the second cavity 415.

The first ferrule 212 can include a sealing surface 420 of the first ferrule 212. The sealing surface 420 of the first ferrule 212 can be a surface of the first ferrule 212. The sealing surface 420 of the first ferrule 212 can be configured to seal against the fitting sealing surface 210. The sealing surface 420 of the first ferrule 212 can seal with the conical sealing surface of the fitting 150. For example, the sealing surface 420 of the first ferrule 212 can form a gas-tight connection with the fitting sealing surface 210.

The first ferrule 212 can include a sealing surface 425 of the first ferrule 212. The sealing surface 425 of the first ferrule 212 can be a surface of the first ferrule 212. The sealing surface 425 of the first ferrule 212 can seal with the outer diameter of the column 115. For example, the sealing surface 425 of the first ferrule 212 can form a gas-tight connection with the outer diameter of the column 115.

The portion of the GC-MS system 100 shown in FIG. 4 can illustrate a state of the system in which the one or more gas purge flow paths 220 are in fluidic communication with the mass spectrometer flow path 155. In this state, there is not a fluid-tight seal between the first ferrule 212, the column 115, and the fitting 150. The column 115 can be completely removed from the fitting 150.

Figure 5:
FIG. 5 is a cross-sectional view of a schematic diagram of computational fluid dynamics simulations of a portion of the gas chromatography mass spectrometry system in accordance with an embodiment.
Figure 5:
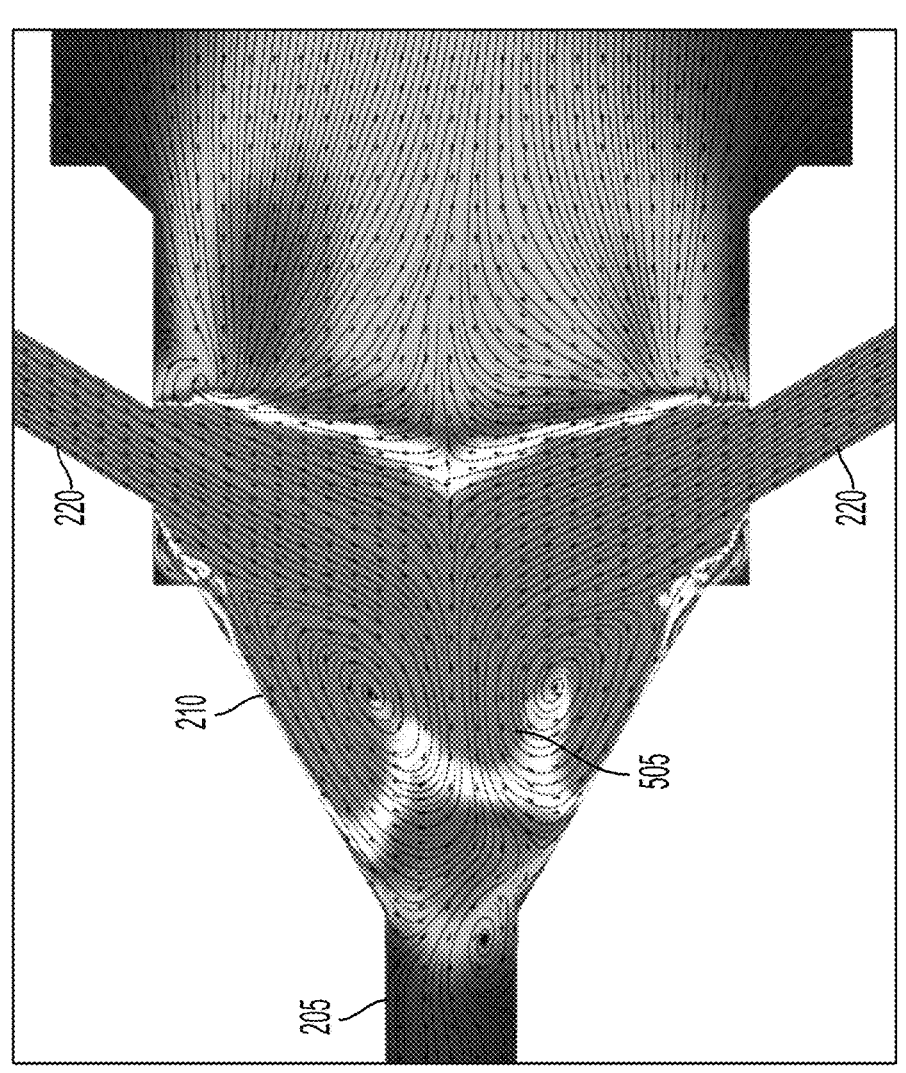

FIG. 5 is a schematic diagram of computational fluid dynamics simulations of a portion of the gas chromatography mass spectrometry system 100. The gas chromatography mass spectrometry system 100 can include the first cavity 205, the sealing surface 210, and the one or more gas purge flow paths 220. Purge gas can flow through the one or more gas purge flow paths 220. The purge gas from the one or more gas purge flow paths 220 can prevent oxygen from entering the mass spectrometer 145. The purge gas from the one or more gas purge flow paths 220 can prevent oxygen from entering the vacuum chamber of the mass spectrometer 145. The purge gas from the one or more gas purge flow paths 220 can fully purge oxygen from a volume 505 defined by the sealing surface 210.

Figure 6:
FIG. 6 is a cross-sectional view of a schematic diagram of a portion of the gas chromatography mass spectrometry system in accordance with an embodiment.
Figure 6:
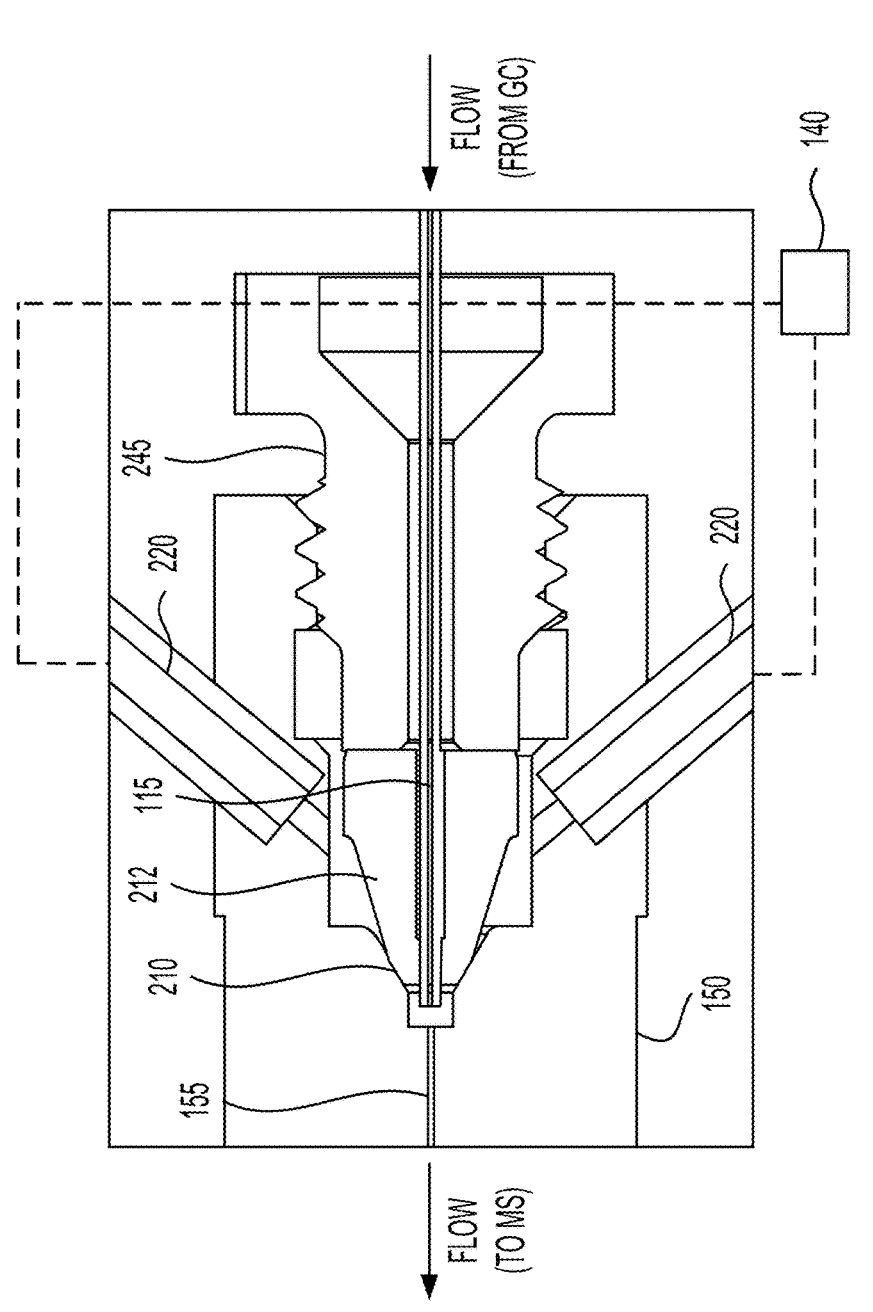

FIG. 6 is a schematic diagram of a portion of the GC-MS system 100. The GC-MS system 100 can include the mass spectrometer flow path 155, the column 115, the electronic pneumatic control module 140, the fitting 150, the sealing surface 210, the first ferrule 212, the one or more gas purge flow paths 220, and the threaded nut 245.

Instead of having the second ferrule 214, the mass spectrometer flow path 155 can be a metal tube (e.g., restrictor) that is brazed or otherwise permanently attached with a gas tight seal to the fitting 150. The fitting 150 can be brazed or otherwise permanently attached with a gas tight seal to the transfer line 250. The mass spectrometer flow path 155 can have a deactivation coating on the interior to prevent interaction of the analytes with the surface of the mass spectrometer flow path 155.

The portion of the GC-MS system 100 shown in FIG. 6 can illustrate a state of the system in which the one or more gas purge flow paths 220 are not in fluidic communication with the mass spectrometer flow path 155. In this state, the column 115 can be fluidically connected to the mass spectrometer flow path 155. Additionally, in this state, there can be a fluid-tight seal between the first ferrule 212, the column 115, and the fitting 150. The column 115 can be installed in the fitting 150.

The fitting 150 can be machined into the end of the transfer line 250. For example, the fitting 150 and the transfer line 250 can be machined out of the same piece of material. The fitting 150 and the transfer line 250 can be machined out of the same piece of material and the inner diameter of the transfer line 250 could be made to be the inner diameter of the mass spectrometer flow path 155. The mass spectrometer flow path 155 can be attached to the fitting 150 through permanent or non-permanent methods. For example, a puck can be brazed onto the end of the mass spectrometer flow path 155. A knife edge or gasket seal between the puck and the fitting 150 and between the puck and the transfer line 250 can be used.

Figure 7:
FIG. 7 is a cross-sectional view of a schematic diagram of a portion of the gas chromatography mass spectrometry system in accordance with an embodiment.

FIG. 7 is a schematic diagram of a portion of the GC-MS system 100. The GC-MS system 100 can include the mass spectrometer flow path 155, the column 115, the electronic pneumatic control module 140, the fitting 150, the sealing surface 210, the first ferrule 212, the one or more gas purge flow paths 220, and the threaded nut 245. Instead of having the second ferrule 214, the mass spectrometer flow path 155 can be a metal tube.

The portion of the GC-MS system 100 shown in FIG. 7 can illustrate a state of the system in which the one or more gas purge flow paths 220 are in fluidic communication with the mass spectrometer flow path 155. In this state, there is not a fluid-tight seal between the first ferrule 212, the column 115, and the sealing surface 210 of the fitting 150. The column 115 can be partially removed from the fitting 150.

Figure 8:
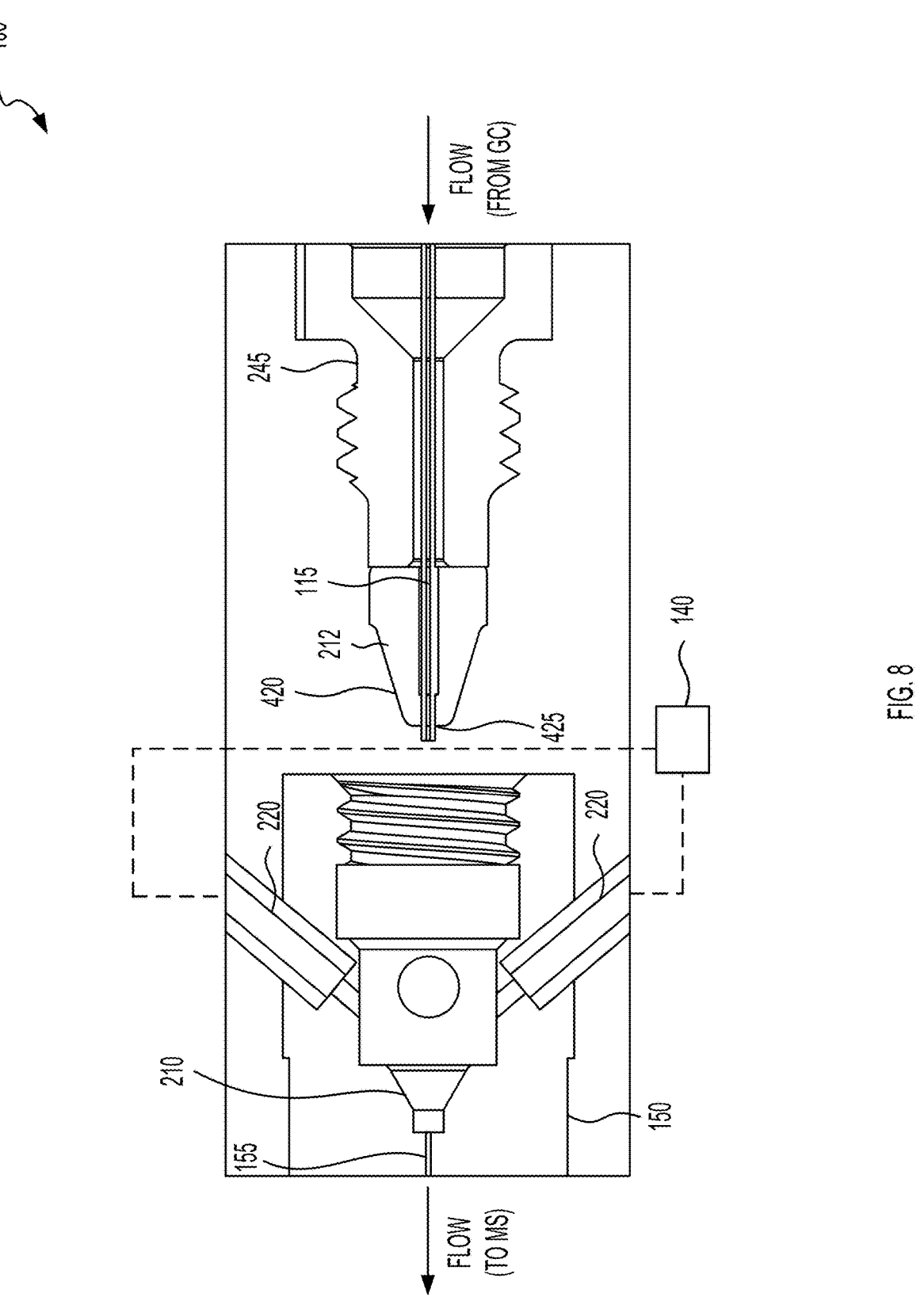
FIG. 8 is a cross-sectional view of a schematic diagram of a portion of the gas chromatography mass spectrometry system in accordance with an embodiment.

FIG. 8 is a schematic diagram of a portion of the GC-MS system 100. The GC-MS system 100 can include the mass spectrometer flow path 155, the column 115, the electronic pneumatic control module 140, the fitting 150, the sealing surface 210, the first ferrule 212, the one or more gas purge flow paths 220, the threaded nut 245, the sealing surface 420 of the first ferrule 212, and the sealing surface 425 of the first ferrule 212. Instead of having the second ferrule 214, the mass spectrometer flow path 155 can be a metal tube.

The portion of the GC-MS system 100 shown in FIG. 8 can illustrate a state of the system in which the one or more gas purge flow paths 220 are in fluidic communication with the mass spectrometer flow path 155. In this state, there is not a fluid-tight seal between the first ferrule 212, the column 115, and the fitting 150. The column 115 can be completely removed from the fitting 150.

Figure 9:
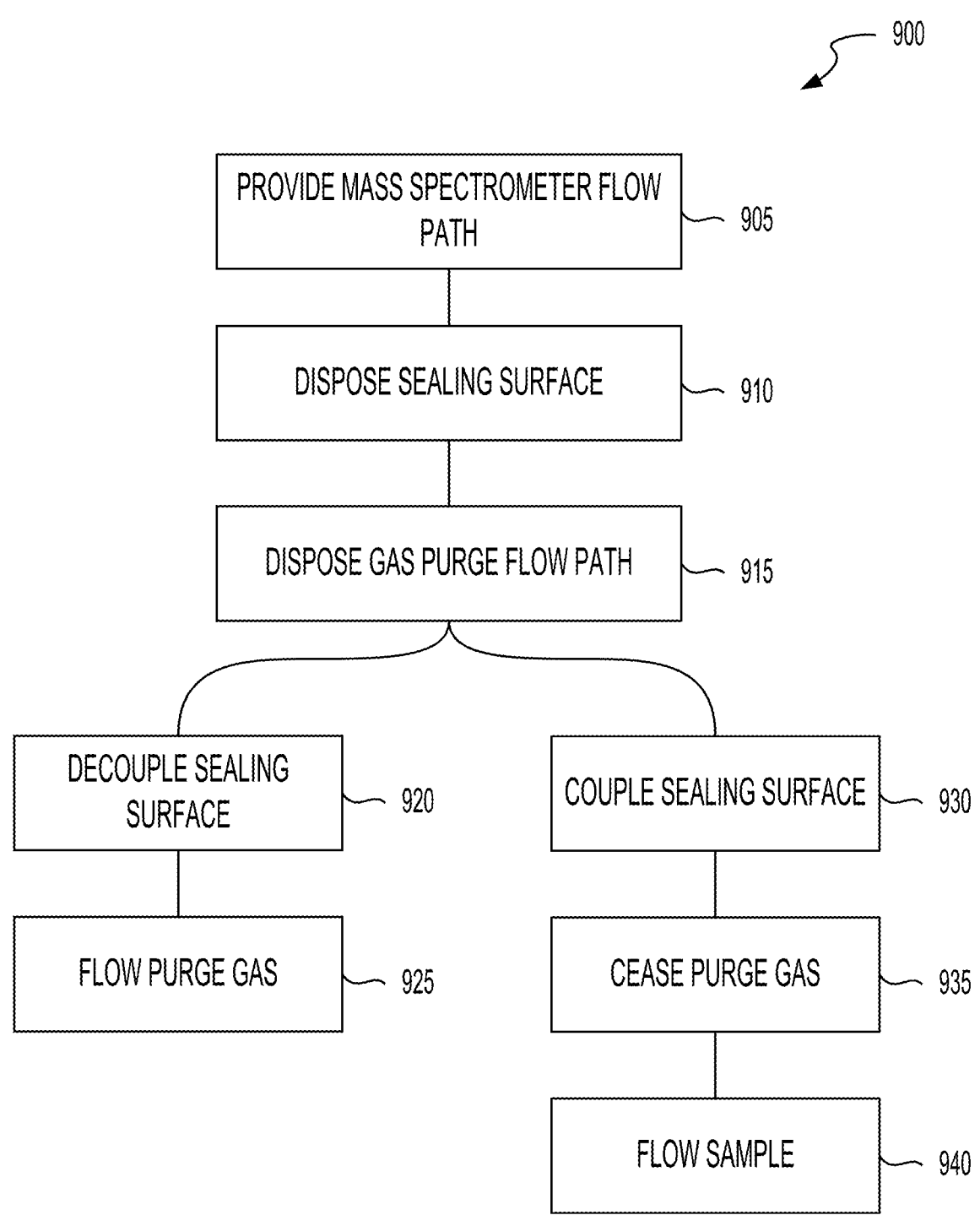
FIG. 9 is a schematic flow diagram illustrating a method for providing a ventless gas chromatography mass spectrometry interface in accordance with an embodiment.

FIG. 9 is a schematic flow diagram illustrating a method 900 for providing a ventless gas chromatography mass spectrometry interface. The method 900 can include providing a mass spectrometer flow path (BLOCK 905). The method 900 can include disposing a sealing surface (BLOCK 910). The method 900 can include disposing one or more gas purge flow paths (BLOCK 915). In a first state, the method 900 can include decoupling the sealing surface from a ferrule (BLOCK 920). In the first state, the method 900 can include flowing a purge gas (BLOCK 925). In a second state, the method 900 can include coupling the sealing surface (BLOCK 930). In the second state, the method 900 can include ceasing a flow of the purge gas (BLOCK 935). In the second state, the method 900 can include flowing a sample (BLOCK 940).

The method 900 can include providing a mass spectrometer flow path (BLOCK 905). The mass spectrometer flow path can be downstream of the column. The mass spectrometer flow path can include a tube. The mass spectrometer flow path can be coupled with a transfer line. The mass spectrometer flow path can be coupled with the first cavity.

The method 900 can include disposing a sealing surface (BLOCK 910). For example, the method 900 can include disposing the sealing surface upstream and proximate to the mass spectrometer flow path. The sealing surface can include a conical sealing surface.

The method 900 can include disposing one or more gas purge flow paths (BLOCK 915). For example, the method 900 can include disposing one or more gas purge flow paths upstream of the sealing surface. The one or more gas purge flow paths can flow a purge gas. For example, the one or more gas purge flow paths can flow at least one of nitrogen, helium, or hydrogen. The one or more gas purge flow paths can be connected to the fitting. For example, the one or more gas purge flow paths can be connected to the fitting upstream of the sealing surface.

In a first state, the method 900 can include decoupling the sealing surface (BLOCK 920). Decoupling the sealing surface (e.g., ferrule seal) can include decoupling the sealing surface of the fitting from the ferrule. For example, decoupling the sealing surface can include separating the sealing surface from the ferrule. Decoupling the sealing surface from the ferrule can put the one or more gas purge flow paths in fluidic communication with the mass spectrometer flow path. Decoupling the sealing surface can include breaking the flow path (e.g., eliminating the gas-tight seal between the ferrule and the sealing surface and fluidically connecting the one or more gas purge flow paths with the mass spectrometer flow path). Decoupling the sealing surface from the ferrule can put the gas purge flow path in fluidic communication with the mass spectrometer flow path. The ferrule can couple with a column. In the first state, the column may not be in fluidic communication with the mass spectrometer flow path.

In the first state, the method 900 can include flowing a purge gas (BLOCK 925). Flowing the purge gas can include flowing the purge gas through the one or more gas purge flow paths. Flowing the purge gas can occur simultaneously with decoupling the sealing surface. Flowing the purge gas can occur automatically. For example, flowing the purge gas can occur automatically responsive to decoupling the sealing surface. When the user runs a maintenance procedure that involves breaking the flow path, the electronic pneumatic control module can automatically activate purge gas to flow through the one or more gas purge flow paths. Flowing the purge gas can occur before, after, or simultaneously with decoupling the sealing surface. Flowing the purge gas can occur before decoupling the sealing surface from the ferrule can avoid an initial incursion of air into the mass spectrometer before the purge gas ramps up.

Flowing the purge gas through the one or more gas purge flow paths can include flowing the purge gas at a rate of at least 30 mL/min. For example, the flow rate of the purge gas can be greater than or equal to 30 mL/min, 40 mL/min, 50 mL/min, 60 mL/min, 70 mL/min, 80 mL/min, 90 mL/min, 100 mL/min, 125 mL/min, 150 mL/min, 175 mL/min, or 200 mL/min. The method 900 can include controlling the flow rate of the purge gas. Flowing the purge gas through the one or more gas purge flow paths can include flowing the purge gas at a rate of less than 30 mL/min.

In some embodiments, the method 900 can include preventing, in the first state, oxygen from entering the vacuum system or the vacuum chamber of the mass spectrometer. For example, the electronic pneumatic control module can direct gas towards the sealing surface to prevent oxygen from entering the mass spectrometer. The oxygen can be from the ambient air (e.g., room air). The electronic pneumatic control module can direct gas towards the sealing surface to prevent oxygen from entering the vacuum of the mass spectrometer.

The method 900 can include controlling the pressure of the purge gas. For example, the pressure of the purge gas can be in a range of 0.1 psi to 50 psi. For example, the pressure of the purge gas can be in a range of 0.1 psi to 1 psi, 0.1 psi to 5 psi, 0.1 psi to 10 psi, 0.1 psi to 25 psi, 0.1 psi to 50 psi, 1 psi to 5 psi, 1 psi to 10 psi, 1 psi to 25 psi, 1 psi to 50 psi, 5 psi to 10 psi, 5 psi to 25 psi, 5 psi to 50 psi, 10 psi to 25 psi, 10 psi to 50 psi, or 25 psi to 50 psi. The pressure of the purge gas can be greater than 50 psi. The actual operating pressure can vary depending on the hardware configuration (e.g., gas type) and whether there is a restriction built into the device.

After verifying that purge gas is flowing, the user can be notified that the column can be disconnected. When the column is disconnected, an amount of purge gas (e.g., inert purge gas) can leak into the vacuum chamber. The rest of the purge gas can leak out into the oven. After installation of a new column is complete, the user can instruct the system to proceed and the purge gas flow can automatically turn off. Since the vacuum was never compromised and only inert gas entered the GC-MS system, the GC-MS system can be stable and ready for operation in minutes rather than hours.

In a second state, the method 900 can include coupling the sealing surface (BLOCK 930). For example, the method 900 can include coupling the sealing surface with the ferrule. Coupling the sealing surface can include coupling the sealing surface with the ferrule. For example, coupling the sealing surface can include sealing the sealing surface with the ferrule. This can include applying a force to the ferrule to cause the ferrule to seal to the sealing surface and/or the column and create a gas-tight seal between the components.

Coupling the sealing surface with the ferrule can remove the fluidic communication between the one or more gas purge flow paths and the mass spectrometer flow path. Coupling the sealing surface with the ferrule can put the column in fluidic communication with the mass spectrometer flow path. Coupling the sealing surface with the ferrule can create a fluidic connection between the column and the mass spectrometer flow path. Coupling the sealing surface with the ferrule can remove (e.g., eliminate) the fluidic communication (e.g., connection) between the mass spectrometer flow path and the one or more gas purge flow paths. In the second state, the column can be in fluidic communication with the mass spectrometer flow path.

In the second state, the method 900 can include ceasing a flow of the purge gas (BLOCK 935). Ceasing the flow of the purge gas (e.g., turning off the purge gas) can occur simultaneously with coupling the sealing surface. Ceasing the flow of the purge gas can occur automatically. For example, ceasing the flow of the purge gas can occur automatically responsive to coupling the sealing surface. The electronic pneumatic control module can automatically stop the purge gas from flowing through the one or more gas purge flow paths.

In the second state, the method 900 can include flowing a sample (BLOCK 940). For example, the method 900 can include flowing the sample through the column. Flowing the sample through the column can occur after the column has been attached to the fitting and fluidically connected to the mass spectrometer flow path and the purge gas is turned off. Flowing a sample can occur before, after, or simultaneously with ceasing a flow of the purge gas.

A method for providing a ventless gas chromatography mass spectrometry interface can include providing a gas chromatograph. The method can include providing a mass spectrometer connected to the gas chromatograph by a mass spectrometer flow path. The method can include providing a fitting. The fitting can include a sealing surface and one or more gas purge flow paths. The fitting can be fluidically connected to the mass spectrometer. The method can include providing a column disposed in a ferrule. The one or more gas purge flow paths can be connected to the fitting upstream of the sealing surface. The one or more gas purge flow paths are not in fluidic communication with the mass spectrometer flow path when the column is fluidically connected to the mass spectrometer flow path and there is a fluid-tight seal between the ferrule, the column, and the fitting. The one or more gas purge flow paths are in fluidic communication with the mass spectrometer flow path when there is not a fluid-tight seal between the ferrule, the column, and the fitting.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

While operations can be depicted in the drawings in a particular order, such operations are not required to be performed in the particular order shown or in sequential order, and all illustrated operations are not required to be performed. Actions described herein can be performed in a different order.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A gas chromatography mass spectrometry (GC-MS) system comprising:
    a gas chromatograph;
    a mass spectrometer connected to the gas chromatograph by a mass spectrometer flow path;
    a fitting comprising a sealing surface and one or more gas purge flow paths, the fitting fluidically connected to the mass spectrometer; and
    a column disposed in a ferrule,
wherein the one or more gas purge flow paths are connected to the fitting upstream of the sealing surface,
    wherein the one or more gas purge flow paths are not in fluidic communication with the mass spectrometer flow path when the column is fluidically connected to the mass spectrometer flow path and there is a fluid-tight seal between the ferrule, the column, and the fitting, and
    wherein the one or more gas purge flow paths are in fluidic communication with the mass spectrometer flow path when there is not a fluid-tight seal between the ferrule, the column, and the fitting.

2. The GC-MS system of claim 1, wherein the one or more gas purge flow paths comprise a first gas purge flow path and a second gas purge flow path, the first gas purge flow path disposed opposite the second gas purge flow path.

3. The GC-MS system of claim 1, wherein the sealing surface comprises a conical sealing surface configured to seal with the ferrule.

4. The GC-MS system of claim 1, wherein an inner diameter of the mass spectrometer flow path is in a range of 50 μm to 150 μm.

5. The GC-MS system of claim 4, wherein the ferrule is a first ferrule, the GC-MS system further comprising:
    a cavity comprising a first side of the cavity and a second side of the cavity;
    the sealing surface is disposed upstream and proximate to the first side of the cavity; and
    a second ferrule is disposed downstream and proximate to the second side of the cavity.

6. The GC-MS system of claim 5, wherein the second ferrule is configured to couple with a transfer line, the mass spectrometer flow path, and the fitting.

7. The GC-MS system of claim 6, wherein the transfer line is fluidically coupled with a vacuum system.

8. The GC-MS system of claim 4, further comprising:
    a cavity;
    wherein the one or more gas purge flow paths comprise one or more tubes and an angle between the one or more tubes and an axis of the cavity is in a range of 0 degrees to 180 degrees.

9. The GC-MS system of claim 1, wherein the one or more gas purge flow paths are physically connected to the fitting.

10. The GC-MS system of claim 1, wherein the one or more gas purge flow paths are configured to flow at least one of nitrogen, helium, or hydrogen.

11. The GC-MS system of claim 1, wherein:
    the ferrule is configured to couple with a threaded nut; and
    the threaded nut is configured to apply pressure to the ferrule.

12. The GC-MS system of claim 1, wherein the one or more gas purge flow paths comprise one or more tubes and the one or more tubes are connected to the fitting a distance in a range of 0.5 mm to 10 mm upstream of the sealing surface.

13. The GC-MS system of claim 1, wherein the one or more gas purge flow paths comprise one or more tubes fluidically coupled with a cavity, the cavity disposed upstream of the sealing surface.

14. The GC-MS system of claim 13, wherein an angle between the one or more tubes and a surface of the cavity is in a range of 0 degrees to 90 degrees.

15. The GC-MS system of claim 1, wherein an electronic pneumatic control module is configured to control at least one of a flow rate or a pressure of a purge gas disposed in the one or more gas purge flow paths.

16. The GC-MS system of claim 1, wherein the one or more gas purge flow paths comprises one or more tubes and a diameter of the one or more tubes is in a range of 300 μm to 1000 μm.

17. A method, comprising:
    providing a mass spectrometer flow path;
    disposing a sealing surface upstream and proximate to the mass spectrometer flow path;
    disposing one or more gas purge flow paths upstream of the sealing surface;

in a first state:

decoupling the sealing surface from a ferrule to put the one or more gas purge flow paths in fluidic communication with the mass spectrometer flow path, the ferrule configured to couple with a column; and flowing a purge gas through the one or more gas purge flow paths; and in a second state:

coupling the sealing surface with the ferrule to (1) remove the fluidic communication between the one or more gas purge flow paths and the mass spectrometer flow path and (2) put the column in fluidic communication with the mass spectrometer flow path;

ceasing a flow of the purge gas through the one or more gas purge flow paths; and flowing a sample through the column.

18. The method of claim 17, wherein the mass spectrometer flow path is fluidically coupled with a vacuum system, the method further comprising preventing, in the first state, oxygen from entering the vacuum system.

19. The method of claim 17, wherein flowing the purge gas through the one or more gas purge flow paths comprises flowing the purge gas at a rate of at least 30 mL/min.

20. The method of claim 17, further comprising:

controlling at least one of a flow rate or a pressure of the purge gas.

\* \* \* \* \*